US012574270B2

(12) United States Patent
Delshadpour et al.

(10) Patent No.: US 12,574,270 B2
(45) Date of Patent: Mar. 10, 2026

(54) PROGRAMMABLE EQUALIZER

(71) Applicant: NXP USA, Inc., Austin, TX (US)

(72) Inventors: Siamak Delshadpour, Phoenix, AZ (US); David Edward Bien, Glendale, AZ (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 18/467,970

(22) Filed: Sep. 15, 2023

(65) Prior Publication Data

US 2025/0093897 A1 Mar. 20, 2025

(51) Int. Cl.
*H04L 25/03* (2006.01)
*H04B 10/69* (2013.01)

(52) U.S. Cl.
CPC ... *H04L 25/03885* (2013.01); *H04B 10/6971* (2013.01)

(58) Field of Classification Search
None
See application file for complete search history.

(56) References Cited

U.S. PATENT DOCUMENTS

| | | | | |
|---|---|---|---|---|
| 7,737,759 | B2 * | 6/2010 | Gaeta | H03G 7/001 327/63 |
| 8,213,638 | B2 * | 7/2012 | Fan | H04L 25/03038 381/103 |
| 9,225,560 | B1 * | 12/2015 | Mishra | H04L 25/03019 |
| 9,860,086 | B1 * | 1/2018 | Shiraishi | H04B 10/40 |
| 10,164,809 | B2 * | 12/2018 | Ulrich | H04L 25/14 |
| 10,447,507 | B1 | 10/2019 | Zhang et al. | |
| 10,841,134 | B1 * | 11/2020 | Wachi | H04L 25/03146 |
| 10,924,307 | B1 | 2/2021 | Zhang et al. | |
| 10,992,501 | B1 * | 4/2021 | Sun | H03L 7/07 |
| 11,128,497 | B1 * | 9/2021 | Sun | H04L 25/03267 |
| 11,206,160 | B2 | 12/2021 | Delshadpour et al. | |
| 11,296,667 | B1 | 4/2022 | Delshadpour | |
| 11,296,737 | B1 | 4/2022 | Delshadpour | |
| 11,356,302 | B1 * | 6/2022 | Sun | H04B 1/12 |
| 12,068,893 | B2 | 8/2024 | Geng et al. | |

(Continued)

OTHER PUBLICATIONS

Delshadpour, Siamak et al.; "A 20.6 GB/s Programmable Peaking Gain CTLE"; 2020 IEEE 63rd International Midwest Symposium on Circuits and Systems; Aug. 2020; pp. 762-765.

(Continued)

*Primary Examiner* — Thomas J. Hiltunen

(57) ABSTRACT

One example discloses an equalizer, including: a first bias current source coupled to the first transistor, the second impedance and a second supply node; a second bias current source coupled to the second transistor, the first impedance and the second supply node; a third bias current source coupled to the third transistor, the first impedance and the second supply node; a fourth bias current source coupled to the fourth transistor, the second impedance and the second supply node; and a controller; wherein the controller is configured to adjust the first, second, third and fourth current sources to route a first percentage of an amplification current through the first impedance ($Z_{E1}$) and a second percentage of the amplification current through the second impedance ($Z_{E2}$).

16 Claims, 5 Drawing Sheets

(56) References Cited

U.S. PATENT DOCUMENTS

2004/0190661 A1\*   9/2004   Vrazel ............... H04L 25/03885
                                                                 375/350
2021/0359884 A1     11/2021   Delshadpour et al.

OTHER PUBLICATIONS

Delshadpour, Siamak et al.; "A 5.4 Gbps Protocol Based CMOS Limiting ReDriver for Type-C Applications"; 2019 IEEE 62nd International Midwest Symposium on Circuits and Systems; Aug. 2019; pp. 255-258.
Liu, Tong et al.; "A 40Gb/s Linear Redriver with Multi-Band Equalization in 130nm SiGe BiCMOS"; 2021 IEEE BiCMOS and Compound Semiconductor Integrated Circuits and Technology Symposium; Dec. 2021; 4 pages.
U.S. Appl. No. 18/467,932, filed Sep. 15, 2023; 42 Pages.
U.S. Appl. No. 18/467,932; Non-Final Office Action mailed Jul. 30, 2025; 35 Pages.
U.S. Appl. No. 18/467,932; Notice of Allowance mailed Dec. 16, 2025; 7 Pages.

\* cited by examiner

PROGRAMMABLE EQUALIZER

The present specification relates to systems, methods, apparatuses, devices, articles of manufacture and instructions for programmable equalizers.

SUMMARY

According to an example embodiment, an equalizer, comprising: a first transistor and a second transistor both configured to receive a first input signal (IP); a third transistor and a fourth transistor both configured to receive a second input signal (IN); a first impedance ($Z_{E1}$) coupled between the second transistor and the third transistor; a second impedance ($Z_{E2}$) coupled between the first transistor and the fourth transistor; a first load resistance ($R_{L1}$) coupled between the first transistor and the second transistor and a first supply node; a second load resistance ($R_{L2}$) coupled between the third transistor and the fourth transistor and the first supply node; a first bias current source coupled to the first transistor, the second impedance and a second supply node; a second bias current source coupled to the second transistor, the first impedance and the second supply node; a third bias current source coupled to the third transistor, the first impedance and the second supply node; a fourth bias current source coupled to the fourth transistor, the second impedance and the second supply node; and a controller; wherein the controller is configured to adjust the first, second, third and fourth current sources to route a first percentage of an amplification current through the first impedance ($Z_{E1}$) and a second percentage of the amplification current through the second impedance ($Z_{E2}$).

In another example embodiment, wherein a first output (OP) is coupled between the first load resistance ($R_{L1}$) and the first transistor; and wherein a second output (ON) is coupled between the second load resistance ($R_{L2}$) and the fourth transistor.

In another example embodiment, wherein the first supply node is a power supply node; and wherein the second supply node is a ground reference node.

In another example embodiment, wherein the first load resistance ($R_{L1}$) and the second load resistance ($R_{L2}$) are bulk resistors and not parasitic resistances.

In another example embodiment, wherein the first transistor and the second transistor only receives power from the first supply node through the first load resistance ($R_{L1}$); and wherein the third transistor and the fourth transistor only receives power from the first supply node through the second load resistance ($R_{L2}$).

In another example embodiment, wherein the first percentage and the second percentage vary in response to a command sent to the controller.

In another example embodiment, wherein the controller is configured to steer the amplification current between the first impedance and the second impedance by adjusting weight assigned to the first, second, third and fourth current sources.

In another example embodiment, wherein the first and fourth bias current sources are assigned a first weight "a"; and wherein the second and third bias current sources are assigned a second weight "b".

In another example embodiment, wherein the controller is configured to set a+b=1.

In another example embodiment, wherein the controller is configured to set "a" and "b" to set a total transconductance of the equalizer to a constant value.

In another example embodiment, wherein the first impedance ($Z_{E1}$) is a low-frequency (DC) path for the amplification current; and wherein the second impedance ($Z_{E2}$) is a high-frequency (AC) path for the amplification current.

In another example embodiment, wherein the first and second impedances are independently adjustable.

In another example embodiment, wherein the first transistor is a first bipolar transistor (Qi1), the second transistor is a second bipolar transistor (Qi2), the third transistor is a third bipolar transistor (Qi3), and the fourth transistor is a fourth bipolar transistor (Qi4); wherein a base of the first transistor (Qi1) and a base of the second transistor (Qi2) are both configured to receive the first input signal (IP); wherein a base of the third transistor (Qi3) and a base of the fourth transistor (Qi4) are both configured to receive the second input signal (IN); wherein the first impedance is coupled between an emitter of the second transistor and an emitter of the third transistor; wherein the second impedance is coupled between an emitter of the first transistor and an emitter of the fourth transistor; wherein a collector of the first transistor (Qi1) and a collector of the second transistor (Qi2) are both coupled to the first load resistance ($R_{L1}$); and wherein a collector of the third transistor (Qi3) and a collector of the fourth transistor (Qi4) are both coupled to the second load resistance ($R_{L2}$).

In another example embodiment, wherein the first transistor is a first MOS device, the second transistor is a second MOS device, the third transistor is a third MOS device, and the fourth transistor is a fourth MOS device; wherein a gate of the first MOS device and a gate of the second MOS device are both configured to receive the first input signal (IP); wherein a gate of the third MOS device and a gate of the fourth MOS device are both configured to receive the second input signal (IN); wherein the first impedance is coupled between a source of the second MOS device and an source of the third MOS device; wherein the second impedance is coupled between a source of the first MOS device and an source of the fourth MOS device; wherein a drain of the first MOS device and a drain of the second MOS device are both coupled to the first load resistance ($R_{L1}$); wherein a drain of the third MOS device and a drain of the fourth MOS device are both coupled to the second load resistance ($R_{L2}$).

In another example embodiment, wherein the equalizer is a continuous time linear equalizer (CTLE).

In another example embodiment, wherein the controller is configured to adjust a bias current for both the second and third bias current sources coupled to either end of the first impedance ($Z_{E1}$) by varying a first control signal sent to each of the second and third bias current sources; and wherein the controller is configured to adjust a bias current for both the first and fourth bias current sources coupled to either end of the second impedance ($Z_{E2}$) by varying a second control signal sent to each of the first and fourth bias current sources.

In another example embodiment, wherein the first, second, third and fourth bias current sources each include a bias transistor; wherein the bias transistor includes, a first terminal coupled to one of the first, second, third or fourth transistors, a second terminal coupled to the second supply node, and a third terminal coupled to the controller; and wherein the controller is configured to adjust a bias current for each of the first, second, third and fourth bias current sources by varying a control signal sent to the third terminal of each of the bias transistors.

In another example embodiment, wherein the controller includes, a first diode-connected device coupled to the third terminal of each of the second and third bias current sources and to the second supply node; a second diode-connected device coupled the third terminal of each of the first and fourth bias current sources, and to the second supply node;

and a first transistor and a second transistor configured as a current mirror; wherein the first transistor is coupled between the first supply node and the first diode-connected device; wherein the second transistor is coupled between the first supply node and the second diode-connected device; wherein the controller is configured to adjust a bias current for each of the second and third bias current sources by varying a first control signal sent to the third terminal of each; wherein the controller is configured to adjust a bias current for each of the first and fourth bias current sources by varying a second control signal sent to the third terminal of each; wherein the controller is configured to adjust the first control signal in response to a voltage received at a control terminal of the first transistor; and wherein the controller is configured to adjust the second control signal in response to a voltage received at a control terminal of the second transistor.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1:
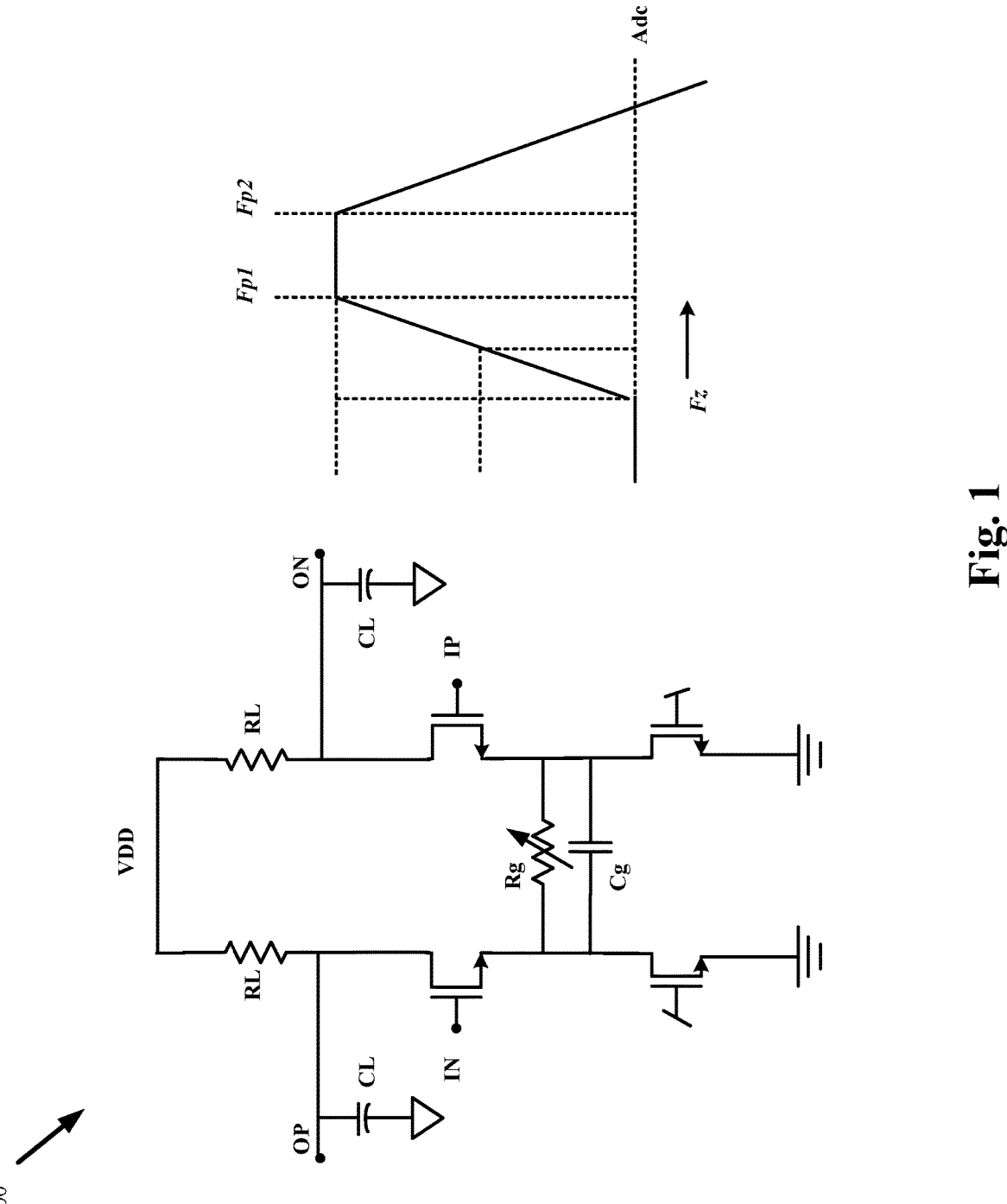
FIG. 1 represents a first example equalizer circuit and its AC gain response.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Equalizers, such as continuous-time linear equalizers (CTLEs), are in some applications employed at a receiver's (RX) front end to compensate for channel loss and provide equalized low-jitter output data. For example, CTLE circuits are used in data communications circuits to shape the pulse response in a way that helps overcome channel losses and impairments for improved data recovery. Longer cable or PCB traces means more insertion loss at certain frequency. A main job of an equalizer is compensation of such loss, so higher loss compensation/higher order pole/zero means compensation of higher loss.

CTLE commonly achieve this by varying their high frequency gain relative to their low frequency gain in order to obtain a desirable response. CTLEs are often implemented as two gain stages in parallel with different frequency characteristics but driving a common load with the gain of one or more stages variable. CTLEs ensure precursor as well as postcursor equalization as compared to other nonlinear equalizers like the decision-feedback equalizers (DFE), which realize only postcursor equalization.

Low power consumption is desirable, and it is an inherent desired feature that the CTLE maintains some minimum linear signal level at a low level of supply current.

FIG. 1 represents a first example 100 of a conventional equalizer circuit. One of the goals of an equalizer is to realize a transfer function which by selecting component values can be tuned such that it is inverse of the channel transfer function. If properly tuned, the equalizer improves the receiver performance parameters, such as BER and jitter tolerance.

Capacitive source-degenerated first order continuous time linear equalizer (CTLE) with one zero and two poles, provide some capability to control a shape of CTLE transfer function. For example, DC gain and transfer function, where $g_m/2$ is a transconductance of differential pair transistors, can be written as: $A_{dc}=R_L/(R_g+1/g_m)$, [equation 1], and $H(s) \approx A_{ac} (1+s\ R_g\ C_g)/((1+2\ s\ C_g/g_m)(1+s\ R_L\ C_L))$, [equation 2].

As it is seen from equation (1), $R_g$ adjustment will change DC gain ($A_{dc}$) and zero location. It is difficult to get high peaking gain and equal gain steps from this conventional topology. A maximum (i.e. peaking) gain is: $A_{pk}=g_m*R_L$, [equation 3]. Although a CMOS based circuit is shown here, BJT based circuits follow similar rules.

Tuning a CTLE's peaking gain is accomplished by changing a source degeneration resistor (Rg) for a MOS device shown here (or similarly for an emitter degeneration resistor for a bi-polar junction transistor). In this way, the DC attenuation will be changed while the peaking gain is fixed, where peaking gain=$g_m*R_L$.

A problem however is when only the degeneration resistor (Rg) is changed, then the peaking frequency will also change because a zero created by degeneration RC pair (i.e. $\omega_{zero}=1/R_g\ C_g$) while the capacitor is fixed. To keep the peak frequency fixed, we need to tune/adjust both $R_g$ and $C_g$ to change the peaking gain while maintaining a same peaking frequency.

In high-speed applications, due to nature of loss and incoming wide-band signals, some programmability in DC gain and/or peaking gain is needed to provide the best equalization. Such programming often includes switchable components which add parasitic effects that can't be easily handled by the CTLE. These parasitic resistance and capacitance can't be well controlled and will cause unexpected peaking at low frequency or reduce the expected tuning range because the parasitic resistor and capacitor need to be calculated into the total amount of caps and resistors we can have for the tuning part, so the actual tuning range will be reduced by the parasitic.

Due to these parasitic components, if using discrete tuning steps, then there would need to be different resistor and capacitor settings for each step. If using a varactor as the tuning capacitor, the varactor will introduce less parasitic effects to the CTLE, but tuning will not be predictable because an exact value of the varactor would be unknown. Adding another tuning/trimming for varactor is expensive and adds more parasitic components.

Even less desirable, cascading two of such CTLEs would result in peaking gain over PVT variations that are twice that of a single stage CTLE.

For differential equalizers transistor pairs are often used as gain stages and their bias current is varied to control the equalizer's gain. Equalizers with such bias-controlled (BC) gain stages have an inherent disadvantage because for example reducing the bias current also reduces the equalizer's linear range along with its gain. Additionally, reducing the bias current is likely to negatively impact transistor linearity and frequency response causing further equalizer performance impairments.

Some equalizers, e.g. two dimensional equalizers, also connect their transistors directly to their power supply (e.g. Vdd, Vcc, etc.) creating a number of additional power source loads (e.g. "dummy loads") to keep a total transconductance ($g_m$) of their cores (i.e. $g_{m1}+g_{m2}$) constant. Note, any transistor directly connected to a power supply is herein defined as a "dummy load". Such dummy current paths divert signal amplification currents away from their load impedances and do not contribute to the equalizer's output signal amplification.

Now discussed are example embodiments of equalizer circuit topologies that enable more predictable programmability and without such parasitic currents. In some example embodiments, these equalizer circuit topologies consume about 50% less current compared to other equalizers.

These "two dimensional" equalizer topologies provide similar performance (AC peaking gain and DC gain) with less generated input referred noise due to up to half of the needed core amplification transistors (e.g. lower noise is important for PAM4 applications). "Two dimensional" is herein defined as an equalizer that uses a combination of DC and AC gains to shape an overall equalizer gain curve.

These topologies are good for very high frequency applications which need high AC peaking gain due to higher channel loss (e.g. like PAM4 modulation in PCIe6 system). These example equalizers can additionally be used in signal conditioners for USB3, USB4, DP, PCIe4, PCIe5, PCIe6 or any other wired high speed communication standards.

These equalizers are designed to selectively control amplification between a low-frequency (DC) signal amplification path and a high-frequency (AC) signal amplification path. The low-frequency (DC) path has zero or low peaking gain, and the high-frequency (AC) path provides the maximum peaking gain. These AC and DC amplification paths are selectable by adjusting their various core transistor currents that defines each path's transconductance ($g_m$). Pole/zero (i.e. degeneration impedance) for each path can also be adjusted separately, such as by varying each path's impedances, allowing greater equalizer gain curve control.

These equalizer topologies can be designed using either MOS device or bipolar transistors. No extra gain stage for the low-frequency (DC) signal amplification (e.g. 0 dB) is needed. Also in some example embodiments, high-frequency (AC) signal amplification peaking gain control path uses a signal-cancellation approach that improves linearity for lower programmed gain levels while maintaining low power consumption.

Figure 2:
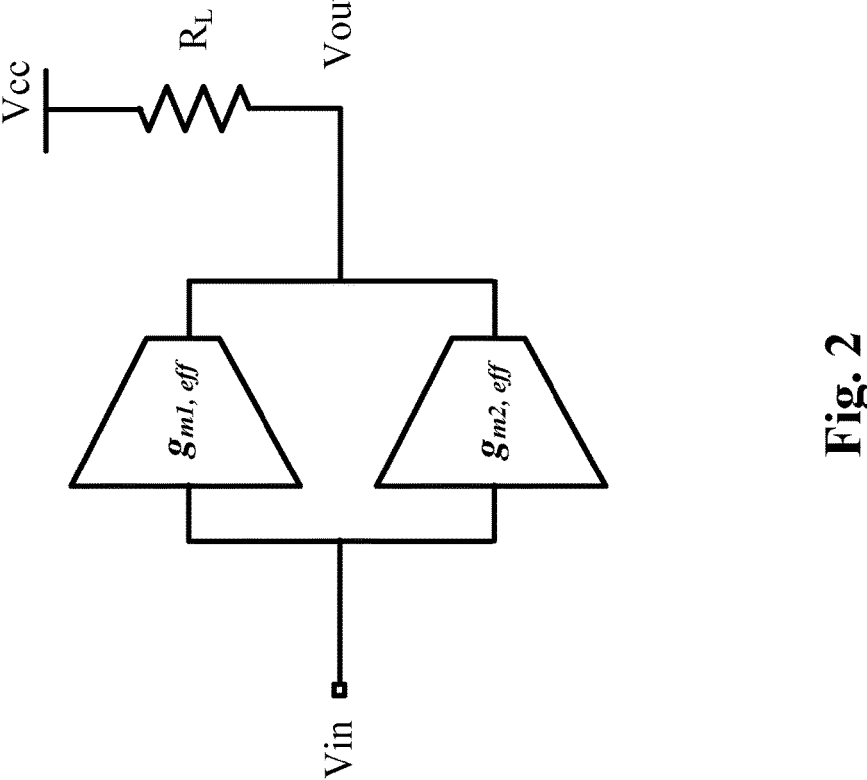
FIG. 2 represents a second example equalizer circuit.
Figure 2:

FIG. 2 represents a second example equalizer circuit 200. It is shown as single ended but it can be in differential format too. The input signal, Vin for the second example equalizer circuit 200 includes two independent and parallel signal paths (e.g. a low-frequency (DC) signal amplification path and a high-frequency (AC) signal amplification path) which have different "effective transconductance ($g_m$) transfer functions".

In this example, $g_{m1,eff}$ represents the low-frequency (DC) signal amplification path and $g_{m2,eff}$ represents the high-frequency (AC) signal amplification path.

The low-frequency (DC) ($g_{m1,eff}$) path has no or low peaking gain, which is referred as "flat band". This path sets the low frequency gain for the equalizer 200. It exhibits low pass feature with the bandwidth slightly greater than the Nyquist frequency of the data signal.

The high-frequency (AC) ($g_{m2,eff}$) path provides the peaking gain for the equalizer.

Through a weighted summation of these two signal paths, the equalizer 200 peaking gain can be programmable from 0 dB (i.e. flat band gain) to a predetermined (e.g. 20 dB) maximum peaking gain.

A design for the equalizer 200 that keeps $g_{m1,eff}+g_{m2,eff}=Gm$ constant would satisfy the following equations: $g_{m1,eff}=g_{m1}/(1+(g_{m1}+g_{m2})Z_{E1})$, [equation 4]; $g_{m2,eff}=g_{m2}/(1+(g_{m1}+g_{m2})Z_{E1})$, [equation 5]; and Vout/Vin=$(g_{m1,eff}+g_{m2,eff})R_L$ [equation 6].

For a maximum equalizer 200 peaking gain $g_{m1,eff}$ will stay at its minimum value and $g_{m2,eff}$ will stay at its maximum value. Both $g_{m1,eff}$ and $g_{m2,eff}$ are implemented in form such as shown in [equation 4] and [equation 5].

In the example embodiment shown, the load resistance, $R_L$ is shown as bulk resistors, but they can be alternatively considered as load impedances ($Z_L$) (e.g. a combination of resistors, capacitors and/or inductors).

Figure 3:
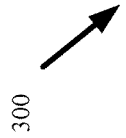
FIG. 3 represent a third example equalizer circuit.

FIG. 3 represent a third example equalizer circuit 300. The third example equalizer circuit 300 has a bias-controlled (BC) gain stage topology and includes: a first supply node 302 (e.g. power supply node configured to be coupled to a voltage supply (Vcc)), a second supply node 303 (e.g. ground reference node), a first input (IP), a second input (IN), a first output (OP), a second output (ON), a first load resistance ($R_{L1}$), a second load resistance ($R_{L2}$) (which is equal to $R_{L1}$ in a differential circuit implementation), a first transistor (e.g. bipolar (Qi1), or MOS), a second transistor (e.g. bipolar (Qi2), or MOS), a third transistor (e.g. bipolar (Qi3), or MOS), a fourth transistor (e.g. bipolar (Qi4), or MOS), a first impedance ($Z_{E1}$) (e.g. Rg) for the low-frequency (DC) path, a second impedance ($Z_{E2}$) (e.g. 1/(Lg+2/Cg)||1/Rg)) for the high-frequency (AC) path, a first bias current source 304 ($a*I_E$), a second bias current source 306 ($b*I_E$), a third bias current source 308 ($b*I_E$), a fourth bias current source 310 ($a*I_E$), and a controller 312. The controller 312 defines a set of weights (e.g. "a" and "b") for each of the bias current sources 304, 306, 308, 310.

The first transistor (Qi1) and the second transistor (Qi2) are both configured to receive the first input signal (IP). The third transistor (Qi3) and the fourth transistor (Qi4) are both configured to receive the second input signal (IN).

The first impedance ($Z_{E1}$) is coupled between the second transistor and the third transistor. The second impedance ($Z_{E2}$) is coupled between the first transistor and the fourth transistor. In various example embodiments, the first impedance ($Z_{E1}$) is equal to Rg, and the second impedance ($Z_{E2}$) is equal to 1/(Lg+2/Cg)||1/Rg. In many example embodiments, these first and second impedances are independently adjustable.

The first load resistance ($R_{L1}$) is coupled between the first transistor and the second transistor and the first supply node 302. The second load resistance ($R_{L2}$) is coupled between the third transistor and the fourth transistor and the first supply node 302. The first load resistance ($R_{L1}$) and the second load resistance ($R_{L2}$) are bulk resistors and not parasitic resistances. In other example embodiments of the equalizer 300, the first and second load resistances ($R_{L1}$, $R_{L2}$) are terminated to ground instead of voltage supply depending on the NPN, PNP, PMOS, or NMOS based implementations of the third equalizer circuit 300.

The first bias current source 304 is coupled to the first transistor, the second impedance ($Z_{E2}$) and the second supply node 303. The second bias current source 306 is coupled to the second transistor, the first impedance ($Z_{E1}$) and the second supply node 303. The third bias current source 308 is coupled to the third transistor, the first impedance ($Z_{E1}$) and the second supply node 303. The fourth bias current source 310 is coupled to the fourth transistor, the second impedance ($Z_{E2}$) and the second supply node 303.

The first output (OP) is coupled between the first load resistance ($R_{L1}$) and a collector of the first transistor (Qi1). The second output (ON) is coupled between the second load resistance ($R_{L2}$) and a collector of the fourth transistor (Qi4).

The controller 312 can be configured to adjust the first, second, third and fourth current sources to route different percentages of an equalizer's amplification current through either the first impedance ($Z_{E1}$) and the second impedance ($Z_{E2}$).

For example, in response to a first command (e.g. perhaps received from an I2C bus standard interface) the controller 312 is configured to adjust the first, second, third and fourth current sources 304, 306, 308, 310 to place the equalizer 300 into a primarily low-frequency (DC) signal amplification configuration that routes much of the amplification current from the first supply node 302 (e.g. power supply node) and the second supply node 303 (e.g. ground reference node), and AC current goes through the first impedance ($Z_{E1}$).

Alternatively, in response to a second command the controller 312 is configured to adjust the first, second, third and fourth current sources 304, 306, 308, 310 to place the equalizer 300 into a primarily high-frequency (AC) signal amplification configuration that routes much of the amplification current from the first supply node 302 (e.g. power supply node) and the second supply node 303 (e.g. ground reference node), and AC current goes through the second impedance ($Z_{E2}$).

Thus, the controller 312 steers varying percentages of the amplification current through the first impedance and the first impedance by weighting the first, second, third and fourth current sources 304, 306, 308, 310. For example, the controller 312 is configured to adjust, the first bias current source 304 by a first weight (a); the second bias current source 306 by a second weight (b); the third bias current source 308 by the second weight (b); and the fourth bias current source 310 by the first weight (a). For example, FIG. 3 shows bias currents $a*I_E$ and $b*I_E$, where "$I_E$" is a common part of the bias current, a and b show the applied weights by the controller circuit of 312.

In some example embodiments, the controller 312 sets a+b=1, while in other example embodiments the two weighting factors can be controlled independently. When a+b=1 then a total current $g_m=I_C/V_T$ which goes to load stays constant to keep gm1+gm2 constant, and since $g_{m1}=I_{C1}/V_T=a*I_E/V_T$ and $gm2=I_{C2}/V_T=b*I_E/V_T$, then $g_{m1}+g_{m2}=I_E/V_T$ is constant. By keeping the total current constant, the sum of transistor device transconductances $g_{m1}+g_{m2}$ will also be relatively constant. However, because the effective gains of the amplifying stages depends on the effective degenerative impedances $Z_{E1}$ and $Z_{E2}$, having constant total current is not a necessary condition for gain control or for operation of the equalizer 300 in some example embodiments.

Thus, referring to equations 4 and 5, the first impedance ($Z_{E1}$) (e.g. Rg) is used by the controller 312 to form part of the low-frequency (DC) signal amplification path, and the second impedance ($Z_{E2}$) (e.g. $1/(Lg+2/Cg)\|1/Rg$)) is used by the controller 312 to form part of the high-frequency (AC) signal amplification path.

The third example equalizer circuit 300 also contain no shunting (i.e. dummy current) paths since the first transistor and the second transistor only receive power from the first supply node through the first load resistance ($R_{L1}$), and the third transistor and the fourth transistor only receive power from the first supply node through the second load resistance ($R_{L2}$).

Figure 4:
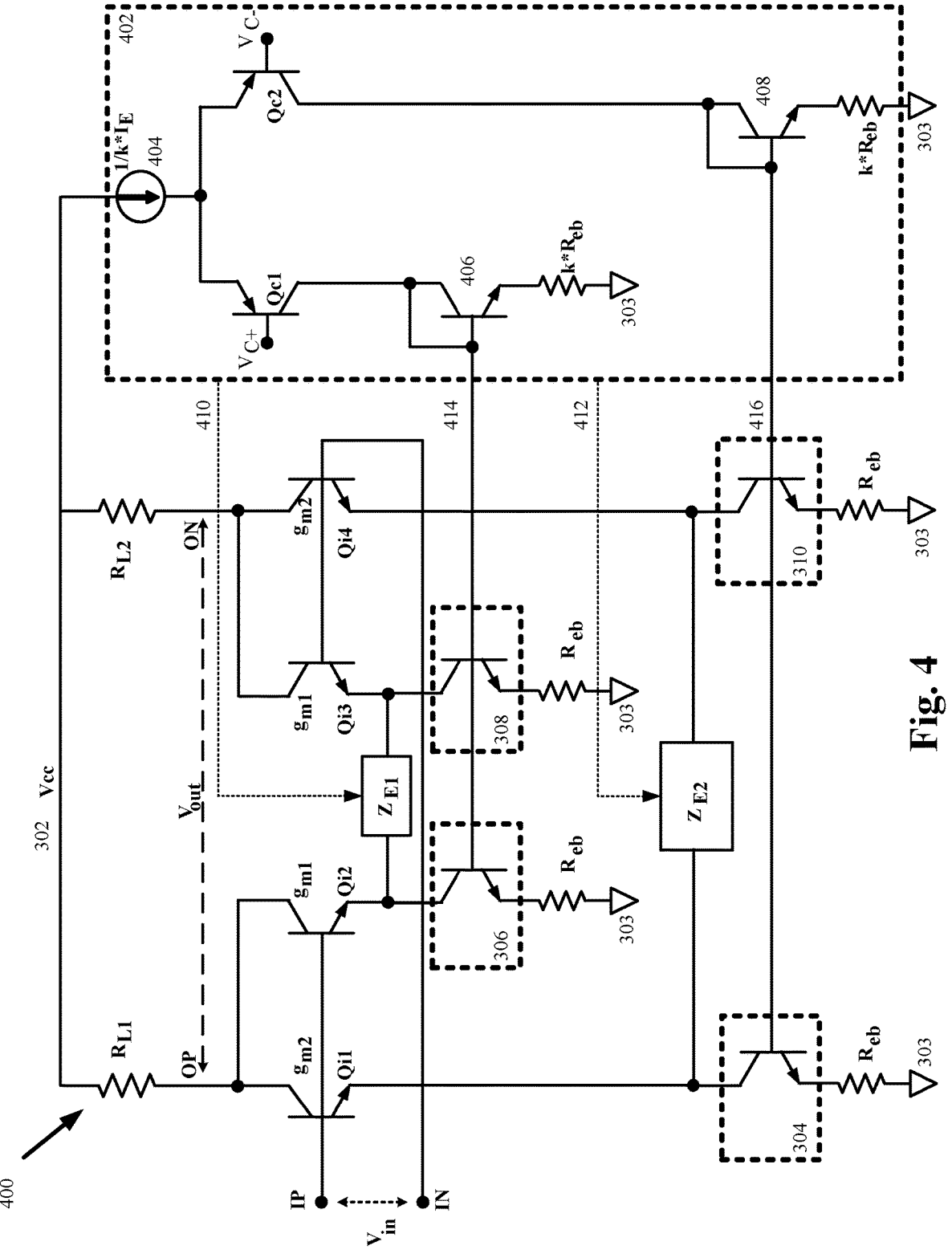
FIG. 4 represents a fourth example equalizer circuit.

FIG. 4 represents a fourth example equalizer circuit 400. The fourth example equalizer circuit 400 also has a bias-controlled (BC) gain stage topology that adds more detail to the third example equalizer circuit 300 just discussed.

The controller 402 adjusts the low-frequency (DC) signal amplification path gain by varying bias current of transistors 306 and 308 equally, bias current of Qi2 and Qi3, which varies $g_{m1}$ and practically, $g_{m1,eff}$ referring to equation 4. The controller 402 adjusts the high-frequency (AC) signal amplification path gain by varying bias current of transistors 304 and 310, equally, bias current of Qi1 and Qi4, which varies $g_{m2}$ and practically, $g_{m2,eff}$ referring to equation 5.

Additionally, in some example embodiments $Z_{E1}$ and $Z_{E2}$ are fixed, while in other example embodiments $Z_{E1}$ and $Z_{E2}$ can be varied (e.g. the first impedance ($Z_{E1}$) (e.g. Rg) can be varied using a first control line 410, and/or the second impedance ($Z_{E2}$) can be varied using a second control line 412).

The controller 402 includes: a current source 404 ($I_E*1/k$) coupled to the first supply node 302; transistors Qc1 and Qc2 configured to respectively receive $V_{C+}$ and $V_{C-}$ control voltages and together form a current mirror; a first diode-connected device 406 coupled through a resistance (k*Reb) to the second supply node 303, and a second diode-connected device 408 coupled through a resistance (k*Reb) to the second supply node 303, wherein "k" is a scaling factor which defines the total consumed current in 402 as a ratio of $I_E$ as a design parameter. The $V_{C+}$ and $V_{C-}$ control voltages can be preset to fixed voltages for a CTLE with fix peaking gain or programmable, e.g. using an DAC (digital to analog convertor) to provide multiple steps which DAC itself can be programmed perhaps over an I2C communications bus standard interface.

The first, second, third and fourth current sources 304, 306, 308, 310 are shown as transistors coupled to either the first diode-connected device 406 by a third control line 414, or coupled to the second diode-connected device 408 by a fourth control line 416. The "a" and "b" weightings first, second, third and fourth current sources 304, 306, 308, 310 are thus set by the first diode-connected device 406 and the second diode-connected device 408 output signals from the controller 402.

In response to the $V_{C+}$ and $V_{C-}$ control voltages connected to the transistors Qc1 and Qc2, the controller 402 sends signals over the third control line 414 and the fourth control line 416 to the first, second, third and fourth current sources 304, 306, 308, 310 to steer/route varying percentages of the equalizer's amplification current from the first supply node 302 (e.g. power supply node) and the second supply node 303 (e.g. ground reference node) by adjusting $g_{m1}$ and $g_{m2}$, transconductance of Qi2/Qi3 and Qi1/Qi4.

In some example embodiments, the weights a+b=1; however, in other example embodiments "a" and "b" can be set independently to any value between 0 and 1 (e.g. for some applications "a" and "b" are only limited based on an acceptable range of equalizer DC operating points).

The fourth example equalizer circuit 400 may be particularly useful for low-voltage supply (Vcc) applications since there are only two stacked transistors (e.g. Qi1 and 304, Qi2 and 306, Qi3 and 308, Qi4 and 310), in the equalizer's core.

While PNP base control transistors are shown in FIG. 4, in alternate example embodiments, they can be replaced NPN transistor or various MOS device transistors depending on the way control part is designed.

Figure 5:
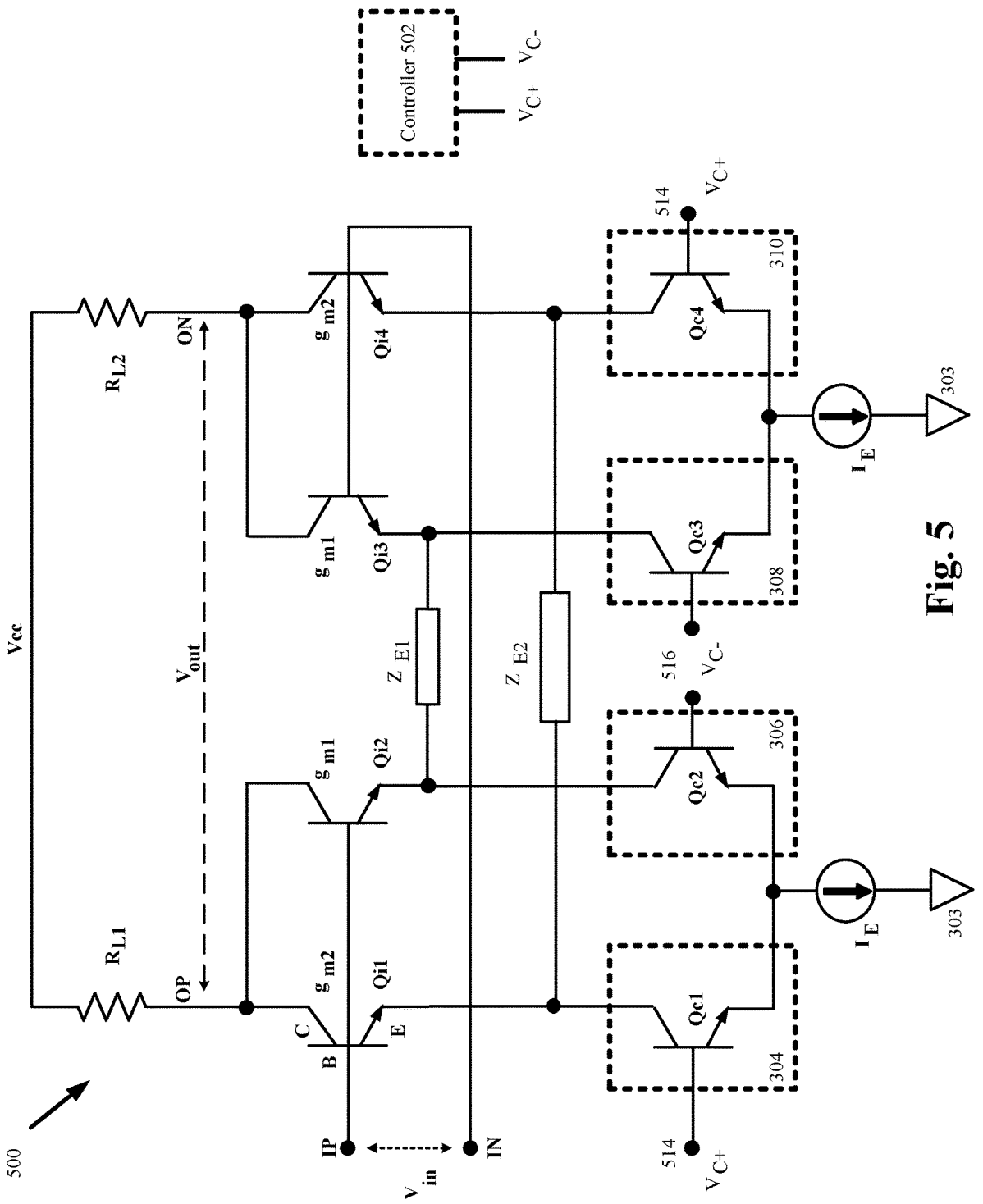
FIG. 5 represents a fifth example equalizer circuit.

FIG. 5 represents a fifth example equalizer circuit 500. The fifth example equalizer circuit 500 also has a bias-controlled (BC) gain stage topology that adds more detail to the third example equalizer circuit 300 previously discussed.

The controller 502 also adjusts the low-frequency (DC) signal amplification path gain by varying bias current of transistors Qc2 and Qc3, equally, bias current of Qi2 and Qi3, which varies $g_{m1}$ and practically, $g_{m1,eff}$ referring to equation 4. The controller 502 adjusts the high-frequency (AC) signal amplification path gain by varying bias current of transistors Qc1 and Qc4, equally, bias current of Qi1 and Qi4, which varies $g_{m2}$ and practically, $g_{m2,eff}$ referring to equation 5.

The controller 502 is configured to output two control voltages $V_{C+}$ and $V_{C-}$ which can either be preset to fixed voltages for a fixed peaking gain, or made programmable for a variable peaking gain. For example, a maximum high-frequency (AC) signal amplification peaking gain will be when $g_{m2,eff}$ gets its maximum value. That means that almost all $I_E$ should flow to Qc1/Qc4 or equally Qi1/Qi4. In theory, this will be equal to case $Z_{E2} \sim 0$ which makes AC gain equal to $\sim g_{m2} * R_L$. Where a minimum high-frequency signal amplification peaking gain will be when $g_{m1}$ at its maximum value, means all IE will go to Qc2/Qc3 or equally Qi2/Qi3 which makes $g_{m1,eff}$ at its maximum value (and $g_{m2,eff}$ at its minimum value). This will happen by varying $V_{C+}$ and $V_{C-}$ voltages which will be done by the controller 502. The controller 502 can be a DAC which provides $V_{C+}$ and $V_{C-}$ from digital codes that can be programmed using I2C or any other control interface scheme.

The first, second, third and fourth current sources 304, 306, 308, 310 are shown as transistors coupled to either of the two control voltages $V_{C+}$ and $V_{C-}$. The "a" and "b" weightings first, second, third and fourth current sources 304, 306, 308, 310 are directly set by these two control voltages $V_{C+}$ and $V_{C-}$ as shown. For comparison, the controller 402 in FIG. 4 uses a current mirror approach.

The $V_{C+}$ and $V_{C-}$ control voltages are sent by the controller 502 over the third control line 514 and the fourth control line 516 to the first, second, third and fourth current sources 304, 306, 308, 310 to steer/route varying percentages of the equalizer's amplification current from the first supply node 302 (e.g. power supply node) and the second supply node 303 (e.g. ground reference node).

This fifth example equalizer circuit 500 is useful for higher supply applications, e.g. 3.3V because the circuit 500 employs stacked transistors in addition to the bias current sources. The circuit 500 can also be used at lower supply voltages depending on signal swing requirements and appropriate design considerations for transistor bias and current source implementation.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. An equalizer, comprising:

a first transistor and a second transistor both configured to receive a first input signal;

a third transistor and a fourth transistor both configured to receive a second input signal;

a first impedance coupled between the second transistor and the third transistor;

a second impedance coupled between the first transistor and the fourth transistor;

a first load resistance coupled between the first transistor and the second transistor and a first supply node;

a second load resistance coupled between the third transistor and the fourth transistor and the first supply node;

a first bias current source coupled to the first transistor, the second impedance and a second supply node;

a second bias current source coupled to the second transistor, the first impedance and the second supply node;

a third bias current source coupled to the third transistor, the first impedance and the second supply node;

a fourth bias current source coupled to the fourth transistor, the second impedance and the second supply node; and a controller;

wherein the controller is configured to adjust the first, second, third and fourth current sources to route a first percentage of an amplification current through the first impedance and a second percentage of the amplification current through the second impedance; and wherein the first transistor and the second transistor are directly connected to the first load resistance;

wherein the third transistor and the fourth transistor are directly connected to the second load resistance;

wherein the controller is configured to adjust a bias current for both the second and third bias current sources coupled to either end of the first impedance $(Z_{E1})$ by varying a first control signal sent to each of the second and third bias current sources;

wherein the controller is configured to adjust a bias current for both the first and fourth bias current sources coupled to either end of the second impedance $(Z_{E2})$ by varying a second control signal sent to each of the first and fourth bias current sources;

wherein the controller is configured to steer the amplification current between the first impedance and the second impedance by adjusting weights assigned to the first, second, third and fourth bias current sources, wherein the weights assigned to the first, second, third and fourth bias current sources are directly set by the first and second control signals, and wherein the controller comprises a digital to analog convertor that provides the first and second control signals from digital codes that can be programmed using a control interface.

2. The equalizer of claim 1:

wherein a first output (OP) is coupled between the first load resistance and the first transistor; and wherein a second output (ON) is coupled between the second load resistance and the fourth transistor.

3. The equalizer of claim 1:

wherein the first supply node is a power supply node; and wherein the second supply node is a ground reference node.

4. The equalizer of claim 1:

wherein the first load resistance and the second load resistance are bulk resistors and not parasitic resistances.

5. The equalizer of claim 1:

wherein the first transistor and the second transistor are both galvanically connected to the first load resistance; and wherein the third transistor and the fourth transistor are both galvanically connected to the second load resistance.

6. The equalizer of claim 1:

wherein the first percentage and the second percentage vary in response to a command sent to the controller.

7. The equalizer of claim 1:

wherein the first and fourth bias current sources are assigned a first weight "a"; and wherein the second and third bias current sources are assigned a second weight "b".

8. The equalizer of claim 7:

wherein the controller is configured to set a+b=1.

9. The equalizer of claim 7:

wherein the controller is configured to set "a" and "b" to set a total transconductance of the equalizer to a constant value.

10. The equalizer of claim 1:

wherein the first impedance $(Z_{E1})$ is a low-frequency (DC) path for the amplification current; and wherein the second impedance $(Z_{E2})$ is a high-frequency (AC) path for the amplification current.

11. The equalizer of claim 1:

wherein the first and second impedances are independently adjustable.

12. The equalizer of claim 1:

wherein the first transistor is a first bipolar transistor (Qi1), the second transistor is a second bipolar transistor (Qi2), the third transistor is a third bipolar transistor (Qi3), and the fourth transistor is a fourth bipolar transistor (Qi4);

wherein a base of the first transistor (Qi1) and a base of the second transistor (Qi2) are both configured to receive the first input signal (IP);

wherein a base of the third transistor (Qi3) and a base of the fourth transistor (Qi4) are both configured to receive the second input signal (IN);

wherein the first impedance is coupled between an emitter of the second transistor and an emitter of the third transistor;

wherein the second impedance is coupled between an emitter of the first transistor and an emitter of the fourth transistor;

wherein a collector of the first transistor (Qi1) and a collector of the second transistor (Qi2) are both directly connected to the first load resistance; and wherein a collector of the third transistor (Qi3) and a collector of the fourth transistor (Qi4) are both directly connected to the second load resistance.

13. The equalizer of claim 1:

wherein the first transistor is a first MOS device, the second transistor is a second MOS device, the third transistor is a third MOS device, and the fourth transistor is a fourth MOS device;

wherein a gate of the first MOS device and a gate of the second MOS device are both configured to receive the first input signal (IP);

wherein a gate of the third MOS device and a gate of the fourth MOS device are both configured to receive the second input signal (IN);

wherein the first impedance is coupled between a source of the second MOS device and an source of the third MOS device;

wherein the second impedance is coupled between a source of the first MOS device and an source of the fourth MOS device;

wherein a drain of the first MOS device and a drain of the second MOS device are both directly connected to the first load resistance;

wherein a drain of the third MOS device and a drain of the fourth MOS device are both directly connected to the second load resistance.

14. The equalizer of claim 1:

wherein the equalizer is a continuous time linear equalizer (CTLE).

15. The equalizer of claim 1:

wherein the first, second, third and fourth bias current sources each include a bias transistor;

wherein the bias transistor includes, a first terminal coupled to one of the first, second, third or fourth transistors, a second terminal coupled to the second supply node, and a third terminal coupled to the controller; and wherein the controller is configured to adjust a bias current for each of the first, second, third and fourth bias current sources by varying a control signal sent to the third terminal of each of the bias transistors.

16. The equalizer of claim 15:

wherein the controller includes, a first diode-connected device coupled to the third terminal of each of the second and third bias current sources and to the second supply node;

a second diode-connected device coupled the third terminal of each of the first and fourth bias current sources, and to the second supply node; and a first transistor and a second transistor configured as a current mirror;

wherein the first transistor is coupled between the first supply node and the first diode-connected device;

wherein the second transistor is coupled between the first supply node and the second diode-connected device;

wherein the controller is configured to adjust a bias current for each of the second and third bias current sources by varying the first control signal sent to the third terminal of each;

wherein the controller is configured to adjust a bias current for each of the first and fourth bias current sources by varying the second control signal sent to the third terminal of each;

wherein the controller is configured to adjust the first control signal in response to a voltage received at a control terminal of the first transistor; and wherein the controller is configured to adjust the second control signal in response to a voltage received at a control terminal of the second transistor.

\* \* \* \* \*